Patented Nov. 1, 1932

1,885,281

UNITED STATES PATENT OFFICE

ROY C. NEWTON, OF CHICAGO, ILLINOIS, ASSIGNOR TO SWIFT AND COMPANY, OF CHICAGO, ILLINOIS, A CORPORATION OF ILLINOIS

METHOD OF NEUTRALIZING FATTY ACIDS IN OILS AND FATS

No Drawing.  Application filed December 19, 1930.  Serial No. 503,522.

This invention relates to an improved and novel refining treatment for oils and fats, particularly oils and fats employed commercially as food materials such as for instance, shortening agents, cooking oils, salad dressing oils and the like.

This invention is particularly characterized by the employment of sodium bicarbonate for neutralizing and removing the free fatty acids present and includes both the process of treatment and the refined oil or fat produced by the process.

This invention is further characterized by conducting the refining process under reduced pressure as by treatment in a closed system with the removal by vacuum of the air and other gases from the space above the surface of the oil or fat being treated.

This invention contemplates the use of sodium bicarbonate with water as for instance in solution, or in a dry state, and the invention is intended to cover both methods. It may be pointed out however, that when dry sodium bicarbonate is employed, the saponification of the free fatty acids is conducted at a higher reaction temperature than is normally employed with neutralizing agents introduced in aqueous solution or in the presence of water.

In commercial practice, it is common to employ caustic soda and other relatively strong alkaline materials for neutralizing and removing free fatty acids present in animal and vegetable oils and fats, and insofar as the applicant is aware, such neutralizing reactions have heretofore been conducted in the presence of water, either by employing an aqueous solution of the alkaline agent or by introducing water to assist the reaction.

It is well known that the use of caustic soda involves certain inherent objections and accordingly, it is an object of this invention to provide a process which is free from the objections accompanying the use of caustic soda and to provide a new and improved method of treatment which is more efficient in practice and which provides many advantages as will be hereinafter more fully pointed out.

When caustic soda is employed, it is found that the strong alkalinity accelerates any oxidation to which the oil or fat may be subjected, which of course, is extremely objectionable. Further, the presence of water inherent in the use of caustic soda and other alkaline aqueous solutions, produces hydrated foots, which are flocculent and therefore difficult to separate from the oil, except by allowing the oil to stand at elevated temperatures for prolonged periods until the foots settle.

This is not only objectionable from the standpoint of prolonging the process, rendering it slow and expensive, but it also results in deterioration of the oil by its contact with the air at the elevated temperature with the consequent loss of a certain portion of the oil due to its emulsification with the foots.

In order to eliminate these difficulties, it is more specifically an object of this invention to provide a refining treatment for oils and fats by which the free fatty acids are effectively removed without liability or oxidation or deterioration and with a maximum yield of the refined oil or fat.

It is a further object to conduct the refining process in the absence of an oxidizing atmosphere and to also produce at least a partial deodorizing treatment during the refining treatment.

It is a further object of this invention to employ sodium bicarbonate for neutralizing and removing the free fatty acids by a reaction conducted at a relatively high temperature in the absence of an oxidizing atmosphere whereby the free fatty acids are effectively neutralized without liability of oxidation and further, the oil or fat is partially deodorized by the action of carbon dioxide gas which is liberated in abundance during the neutralizing reaction.

It is well known to those skilled in the art that in the treatment of oils and fats of the type herein referred to, it is customary to employ a deodorizing treatment after the fatty acids are removed which usually consists in passing steam through the oil or fat while at an elevated temperature. With this in mind, it is contemplated that the treatment for the removal of fatty acids as outlined for this invention, may be conducted simultaneously with the deodorizing treatment as a single operation, but it is to be understood, that the invention is not so limited as the refining treatment alone possesses many advantages, and it is intended that this invention cover the refining treatment when conducted simultaneously with the deodorizing treatment or when conducted as a separate and independent step.

It should be observed however, that the refining treatment of this invention is particularly adapted for combination with the deodorizing treatment as a single operation as distinguished from two separate and independent treatments.

Furthermore, when the refining and deodorizing steps are conducted as a single operation, the advantageous results are new and unexpected, and are more than those advantages which would be derived from a mere combination of two old and separately conducted treatments.

In the first place, when the two treatments are conducted as a single operation, the handling of the oil and fat is of course, reduced and the time and expense minimized, which results in the elimination of exposure to oxidizing atmospheres and the consequent loss of a portion of the treated material. This fact alone eliminates waste and makes for the production of a superior product free from the objectionable odors and inferior keeping qualities produced by oxidation.

Furthermore, it enables both the refining and deodorizing treatments to be conducted in the absence of an oxidizing atmosphere and under reduced pressure, which has in addition to the advantages above enumerated, the advantage of extending and increasing the effect of the deodorizing treatment. This advantage is realized by the formation of larger gas bubbles in the oil or fat liquid due to the expansion of the gas under reduced pressure. The deodorizing action is one of evaporating the odorous substances which escape from the surface of the liquid into the steam or other gaseous bubbles and finally pass off therewith. As most of the odorous substances are removed by the action of the bubbles passing through the volume of liquid, it is obvious that the evaporating surface is increased when the size of the bubbles is increased.

Furthermore, the main feature which produces the peculiar combination between the refining and deodorizing treatments when combined as a single operation, is that of partial deodorization of the oil or fat by the bubbles of carbon dioxide which are liberated by the sodium bicarbonate during the neutralizing action and pass upwardly through the liquid.

Accordingly, the sodium bicarbonate is not only effective to produce the desired neutralizing reaction but also supplies a copious quantity of carbon dioxide gas which produces a substantial deodorizing effect during the refining treatment. This partial deodorization of course, reduces the extent of the required treatment by the action of steam, which is an important advantage produced when the two steps are combined and conducted under the conditions of temperature and pressure above outlined for the refining treatment.

In cases where dry sodium bicarbonate is used, instead of a solution thereof, a higher reaction temperature is employed, and notwithstanding the higher temperature, the reaction is free from the undesirable oxidizing danger. The higher temperature and reduced pressure materially assist the evaporation and removal of the odorous substances in the deodorizing treatment.

In the absence of water, the neutralizing action does not commence until at least some portion of the sodium bicarbonate is ionized or otherwise influenced by the oil itself, to the extent that the reaction will commence and when once started, additional amounts of the sodium bicarbonate are likewise affected, so that the neutralizing reaction goes to completion.

In practice with dry sodium bicarbonate, it is found that the reaction takes place at a temperature of approximately 320 degrees F.

Although in many instances it may be advantageous to conduct the refining and deodorizing treatments simultaneously, it is to be understood that the invention is not so limited. When the refining treatment is conducted independently, the carbon dioxide which is liberated during the neutralizing reaction will partially deodorize the oil or fat whereby the necessary subsequent steam treatment will be substantially reduced.

In order to illustrate a preferred method of practicing this invention, reference may be had to the following:

The quantity of sodium bicarbonate employed is preferably the amount theoretically required for neutralizing the free fatty acids present. The sodium bicarbonate is introduced in dry form or as a solution and suspended in the oil or fat and the mixture then drawn into a vacuum deodorizer either at the beginning of the deodorizing process or at some later stage, before the oil is pumped out. When dry sodium bicarbonate is used, the temperature is then raised to about 320 degrees F. at which a reaction takes place between the free fatty acid and the sodium bicarbonate.

If it is desired to deodorize the oil in the same operation, this is carried on in the usual manner by blowing superheated steam into the oil or fat under reduced pressure and at a relatively high temperature. For instance, the usual temperature for the deodorizing treatment is preferably about 360-400 degrees F. when the sodium bicarbonate is dry. If this treatment is conducted in the presence of moisture, the deodorizing temperature may be somewhat lower.

Whether the refining treatment be conducted simultaneously with the deodorizing treatment or separate therefrom, as an independent operation, it is always conducted under reduced pressure and free from an oxidizing atmosphere, so that the carbon dioxide bubbles which are formed will have a partial deodorizing effect. Furthermore, the deodorizing action is materially enhanced by the relatively high evaporating temperature and the enlarged condition of the gaseous bubbles under the reduced pressure.

When the refining and deodorizing treatments are conducted simultaneously, the conditions of temperature and pressure prevail, and consequently, the deodorizing effect produced by the super-heated steam will be likewise enhanced. However, if the deodorizing steam treatment is conducted as a separate operation reduced pressure may likewise be employed with the elimination of an oxidizing atmosphere.

In the preferred method of practice above outlined, it is found that under conditions of reduced pressure and at temperatures above 320 degrees F. the reaction between the sodium bicarbonate and the free fatty acids in the oils or fats becomes very vigorous with a copious evolution of carbon dioxide. As above mentioned, the escape of the carbon dioxide aids materially in volatilizing and removing the objectionable odors and flavors naturally occurring in oils and fats of the character referred to. At the end of the reaction, the foots are dry and therefore they may be removed by precipitation or by the usual filtration process.

It will be appreciated from the above description, that this invention provides a process which has many advantages and which accomplishes the various objects outlined therefor. It provides a refining treatment which is free from the objections accompanying the use of caustic soda or other strong alkaline neutralizing agents, and yet one which will serve to effectively eliminate the free fatty acids with accompanying advantages such as partial deodorization and freedom from oxidizing dangers.

The process also involves the use of relatively high temperatures whereby the deodorizing treatment is greatly increased and the time required therefore is correspondingly reduced.

The refining treatment is also one which may be advantageously carried out simultaneously with the deodorizing steam treatment whereby to reduce the handling and consequent waste of two separate operations with the advantages for both treatments produced by the reduced pressure, relatively high temperature and elimination of the oxidizing atmosphere.

I claim:

1. The process of removing free fatty acids from oils or fats comprising neutralizing the free fatty acids with sodium bicarbonate under reduced pressure and at a reaction temperature at or above substantially 320 degrees F.

2. The process of removing free fatty acids from oils or fats comprising neutralizing the free fatty acids with sodium bicarbonate under reduced pressure and at a reaction temperature at or above substantially 320 degrees F. and in the absence of ionizing moisture.

3. The process of removing free fatty acids from oils or fats comprising neutralizing the free fatty acids with dry sodium bicarbonate at a reaction temperature at or above substantially 320 degrees F.

4. The process of treating oils or fats comprising neutralizing the free fatty acids with dry sodium bicarbonate at a reaction temperature at or above substantially 320 degrees F. under reduced pressure and in the absence of an oxidizing atmosphere.

5. The process of treating oils or fats comprising neutralizing the free fatty acids with sodium bicarbonate and simultaneously subjecting the oil or fat to the deodorizing action of steam under conditions of reduced pressure and relatively high temperature.

6. The process of treating oil or fats which consists in introducing a quantity of sodium bicarbonate for neutralizing free fatty acids and passing a quantity of deodorizing steam therethrough while maintaining the oil or fat at a temperature at or above substantially 320 degrees F. and under reduced pressure.

7. The process of treating oil or fats which consists in introducing a quantity of dry sodium bicarbonate for neutralizing free fatty acids and passing a quantity of deodorizing steam therethrough while maintaining the oil or fat at a temperature at or above substantially 320 degrees F. and under reduced pressure.

8. The process of treating oil or fats which consists in introducing a quantity of sodium bicarbonate and passing a quantity of deodorizing steam therethrough while maintaining the oil or fat at a temperature at or above substantially 320 degrees F. and under reduced pressure and free from oxidizing atmosphere.

Signed at Chicago, Illinois, this 11th day of December, 1930.

ROY C. NEWTON.